Patented Sept. 3, 1946

2,406,840

UNITED STATES PATENT OFFICE 2,406,840

METHOD OF PREPARING PECTASE

Herbert T. Leo and Clarence C. Taylor, Anaheim, Calif.

No Drawing. Application October 23, 1943, Serial No. 507,454

2 Claims. (Cl. 195—62)

This invention relates to a method of preparing pectase, and more particularly, to a method of preparing an aqueous solution of pectase.

By the term "pectase" we mean an enzymic material derived from a suitable biological or vegetable source and capable of acting on soluble pectin to convert this pectin partially or completely into an insoluble product designated by prior art workers as pectic acid. Whether or not pectase includes only a single enzyme or a group or enzymes is not definitely known. For this reason, the term "pectase" has been used in this application to cover both any single enzyme or any mixture of enzymes capable of acting on soluble pectin with the above mentioned results.

We have found that any rapidly growing vegetable material provides a rich source of pectase. Specific examples are sprouts of the tobacco plant and growing plants of the legume family, particularly clover and alfalfa. However, when infusions of growing leguminous plants are prepared, as by grinding or otherwise breaking up growing leguminous plants, maceration of the crushed material with water and separation of the resulting infusion or extract from residual solid material, the resulting extract or infusion contains in suspension relatively large amounts of finely divided solid particles containing a green coloring matter believed to be chlorophyll. This finely divided suspended matter cannot easily be separated from the infusion or extract and, when the infusion or extract is used to modify soluble pectin, tends to color this pectin as well as the products derived from the pectin by reaction of the pectase, to confer on the treated material and the products of reaction an objectionable green color.

It is therefore an important object of the present invention to provide a method for preparing from growing vegetable material pectase free from objectionable coloring bodies.

Another object of the present invention is to provide an aqueous infusion or extract from growing vegetable material, in particular, leguminous plants, free from objectionable green coloring matter.

Other and further objects and features of this invention will become apparent from the following description and appended claims.

In proceeding according to this invention, we use as starting material any vegetable material rich in pectase. The preferred raw material is a leguminous plant. For purposes of illustration, we will describe the preparation of a pectase infusion from fresh growing green alfalfa.

Fresh growing green alfalfa is first ground or otherwise mechanically disintegrated to break up the stems and crush the leaves. To the ground alfalfa is suitably added cold water. It should be noted in this connection that pectase is inactivated or killed by exposure to a temperature above 170° F. The amount of water used is not critical. However, we have found it suitable to add to each two pounds of the crushed alfalfa one gallon of water. The resulting mixture is preferably, but not necessarily, allowed to stand for a short time, for instance, one-half hour. The mixture is then subjected to a separating operation, for the purpose of liberating the liquid and recovering separately the residual broken up stem and leaf parts. Such separation is preferably effected by means of a thorough pressing operation.

The resulting liquid contains in suspension fine particles containing a green coloring matter believed to be chlorophyll. This suspended matter cannot practically be removed by means of ordinary filtering or settling operations. We have now found that if in this extract or infusion containing finely divided suspended matter, precipitation of aluminum hydroxide is induced, the precipitated aluminum hydroxide will absorb or occlude the finely divided suspended matter, and that the precipitated aluminum hydroxide can easily be separated from the infusion or extract, for instance, by filtration with the use of filter aids or by means of a clarifying centrifuge, such as the well known supercentrifuge commercially used for the clarification of various liquids. The pectase infusion or extract, after precipitation and separation of aluminum hydroxide, contains no finely divided suspended matter having objectionable coloring properties. Further, the above disclosed treatment does not adversely affect the activity or potency of the pectase.

The above disclosed precipitation, in a pectase extract, of aluminum hydroxide, may be effected by means of any soluble aluminum salt and any basic compound capable of reacting with the aluminum salt to precipitate aluminum hydroxide, provided care is taken to avoid the use of any compound having a deleterious effect. Examples of suitable aluminum salts are aluminum chloride, aluminum sulfate and aluminum acetate. Suitable basic materials include sodium carbonate, sodium bicarbonate, sodium hydroxide, calcium carbonate, and magnesium hydroxide. The preferred precipitating agents are aluminum chloride and calcium carbonate.

In operating with aluminum chloride and calcium carbonate, there is added to the green alfalfa extract obtained by pressing, enough calcium carbonate (preferably in the form of precipitated chalk) to effect in the extract a pH value of from 6.00 to 6.80. The preferred pH value is 6.50. Ordinarily about ten grams of chalk are used for each gallon of green alfalfa extract. Then aluminum hydrochloride in the form of an aqueous solution is added in an amount sufficient to effect in the extract a pH of between 4.00 and 4.50. Ordinarily about 110 cc. of a 25% aqueous solution of aluminum chloride hexahydrate suffice for use with one gallon of green alfalfa extract treated with ten grams of chalk.

On addition of the aluminum chloride solution, a precipitate of aluminum hydroxide is formed which carries down the chlorophyll and other suspended matter. This precipitate may be removed by filtration with the help of filter aids, such as a diatomaceous earth sold commercially under the trade name "Filtercel." However, we prefer to remove the green aluminum hydroxide precipitate by means of a supercentrifuge. The resultant clear pectase extract or infusion has not had its activity or potency affected by the precipitation treatment. To preserve the potency of the pectase extract, the extract is best stored in a refrigerator.

We have found that the calcium chloride formed in the pectase extract by the interaction of calcium carbonate and aluminum chloride does not interfere with the activity of the pectase.

In the clarification of pectase solutions according to the present invention, it is desirable to avoid extremely high or extremely low pH conditions. We consequently prefer, when a very strong base is to be used as a precipitating agent, to add the aluminum chloride solution to the extract prior to the addition of the strong base.

However, when calcium carbonate is used as the precipitating agent, the method of operation is very simple and easy to control, since an excess of calcium carbonate is in no way harmful, being incapable of effecting a pH value substantially above 6.80.

Many details of procedure may be varied within a wide range without departing from the principles of this invention, and it is therefore not our purpose to limit this patent otherwise than necessitated by the scope of the appended claims.

We claim as our invention:

1. A method of preparing from growing leguminous plant material a clear colorless pectase extract which comprises mechanically disintegrating said vegetable material, steeping the disintegrated material with water, separating the steeped vegetable material from the resulting green aqueous pectase extract, incorporating with the resulting extract sufficient calcium carbonate to effect in the extract a pH value of at least 6.00, incorporating with the chalk containing extract an amount of a soluble aluminum salt capable of effecting in said extract a pH ranging from 4.00 to 4.50, and separating the resulting precipitate from the extract.

2. A method of preparing a clear colorless infusion of pectase from growing alfalfa which comprises mechanically disintegrating said alfalfa, steeping the disintegrated alfalfa with water, pressing the resultant mixture to extract therefrom a green infusion of pectase, incorporating with each gallon of the extract about ten grams precipitated chalk and about 110 cc. of a 25% aqueous solution of aluminum chloride hexahydrate, and separating the resulting precipitate from the extract by centrifuging.

HERBERT T. LEO.
CLARENCE C. TAYLOR.